(12) United States Patent
Canora et al.

(10) Patent No.: US 8,972,048 B2
(45) Date of Patent: Mar. 3, 2015

(54) SELF-SERVICE BEVERAGE AND SNACK DISPENSING USING IDENTITY-BASED ACCESS CONTROL

(75) Inventors: David J. Canora, Winter Garden, FL (US); Scott W. Rench, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 1677 days.

(21) Appl. No.: 12/275,062

(22) Filed: Nov. 20, 2008

(65) Prior Publication Data

US 2010/0125362 A1  May 20, 2010

(51) Int. Cl.
*G06F 17/00* (2006.01)
*G07F 9/00* (2006.01)
*G06Q 20/32* (2012.01)
*G07F 9/02* (2006.01)

(52) U.S. Cl.
CPC .............. *G07F 9/00* (2013.01); *G06Q 20/3278* (2013.01); *G07F 9/026* (2013.01)
USPC .......................................... 700/237; 700/240

(58) Field of Classification Search
USPC ................................. 700/236, 237, 240, 241
See application file for complete search history.

(56) References Cited

U.S. PATENT DOCUMENTS

| | | | | |
|---|---|---|---|---|
| 5,350,082 A | * | 9/1994 | Kiriakides et al. | 221/1 |
| 5,988,346 A | * | 11/1999 | Tedesco et al. | 700/237 |
| 6,230,150 B1 | * | 5/2001 | Walker et al. | 705/400 |
| 6,304,796 B1 | * | 10/2001 | Ding | 700/237 |
| 6,424,884 B1 | * | 7/2002 | Brooke et al. | 700/232 |
| 6,622,064 B2 | * | 9/2003 | Bartholomew et al. | 700/233 |
| 6,678,579 B2 | * | 1/2004 | Butikofer | 700/235 |
| 7,223,427 B2 | | 5/2007 | Knepler | |
| 7,756,604 B1 | * | 7/2010 | Davis et al. | 700/240 |
| 2005/0087255 A1 | | 4/2005 | Humphrey et al. | |
| 2006/0081653 A1 | | 4/2006 | Boland et al. | |
| 2006/0273120 A1 | | 12/2006 | Staten | |
| 2007/0207040 A1 | | 9/2007 | Hughes et al. | |
| 2007/0215239 A1 | | 9/2007 | Dorney | |
| 2008/0004973 A1 | | 1/2008 | Rothschild | |

* cited by examiner

*Primary Examiner* — Timothy Waggoner

(74) *Attorney, Agent, or Firm* — Marsh Fischmann & Breyfogle LLP; Kent A. Lembke

(57) ABSTRACT

A token-based system providing self-service vending of snacks or beverages. The system includes a vending machine with a controller selectively dispensing goods. A token reader is linked to the controller. Tokens are provided to users of the system that each includes access data. During use, the token reader reads the access data and provides it to the controller. The controller dispenses a unit of the goods based on the access data read from the token. The system provides token-based vending with the token being a handheld or wearable object providing the access data, such as with an RFID tag on a bracelet or pin or with a barcode or magnetic stripe on a card or room key. The vending machine may be a beverage dispenser that dispenses a drink with a user obtaining a disposable container near the dispenser and presenting their token to the token reader.

18 Claims, 4 Drawing Sheets

SELF-SERVICE BEVERAGE AND SNACK DISPENSING USING IDENTITY-BASED ACCESS CONTROL

BACKGROUND OF THE INVENTION

1. Field of the Invention

The present invention relates, in general, to methods and systems for providing self-service beverages and snacks, and, more particularly, to a self-service dispenser with improved access control providing a variety of methods of limiting use of the dispenser including controlling a number of fills/refills or a number of snacks obtained from the dispenser based on the user's identity.

2. Relevant Background

Self-service beverage dispensers are used in numerous environments to dispense drinks such as fountain sodas, iced tea, lemonade, and juice. For example, customers at fast food restaurants often purchase a drink with their meal and are provided a cup to fill themselves using a self-service beverage dispenser that dispenses a number of soft drinks. Self-service beverage dispensers are desirable in many settings because it is typically inefficient for restaurant workers to fill drink orders or perform other services that can easily be performed by the customer without a significant drop in their satisfaction with the dining experience. Due to these and other benefits, self-service beverage dispensers are used in numerous other environments including movie theaters, amusement and theme parks, buffet or cafeteria-style restaurants, and many more settings.

Unfortunately, misuse of self-service beverage dispensers can be expensive and providers of these dispensers are searching for better ways to control access or use. In many settings, a user is simply provided a cup and is allowed unlimited refills, but this practice is becoming too expensive for some restaurants or other providers. These providers have sometimes raised their prices to try to cover users who get multiple refills, but this does not address the problem with people who do not pay and use other cups to obtain free drinks. In other cases, the market simply will not allow increased prices. Other providers of self-service beverage dispensers attempt to limit use of the dispensers by posting signage that state there are no free refills, but reliance of customers to self-police themselves has met with only limited success and many users continue to fill their cups two or more times per visit without making proper payments or reuse a cup on a next visit with no further payment.

To provide enhanced access control, dispensing systems have been developed that allow the dispenser to identify a cup or glass as being authorized for use with a self-service beverage dispenser. In one such system, a customer purchases an "all-you-can-drink" cup that includes an identifier in the form of a scannable bar code. The beverage dispenser includes a bar code reader or scanner and controls that activate the dispenser to dispense to fill a cup when an authorized cup is properly positioned relative to the beverage dispenser (e.g., swipe your cup, select a flavor of soda, and position the cup for filling). In another dispensing system, access control is provided by placing a passive radio-frequency identification (RFID) tag on the cup, and the self-service beverage dispenser includes an RFID reader that activates or reads the RFID tag and verifies the cup is authorized for using or accessing the beverage dispenser. Such a system may further include write capabilities such that the RFID tag may include stored data indicating a number of refills or uses that have been credited to the cup, and the RFID reader of the dispenser may decrement this count on the RFID tag with each use of the dispenser.

A number of problems arise with the use of an unlimited access or all-you-can-drink cup with self-service beverage dispensers. The user is required to maintain possession of the cup in order to obtain refills, which can be problematic at large entertainment facilities and resorts. For example, a customer may purchase an unlimited access cup at a water or amusement park for use all day. They must maintain possession of the cup throughout their visit to get refills, and, if they lose their cup, their privilege to unlimited access to the dispenser is also lost. In some environments, the customer may even be forced to carry the cup back to their hotel room or other off-site destination and back with them when they re-enter to continue to use the cup. In addition to the inconvenience of carrying a large drink cup around, the customer may also be concerned with sanitation having to clean the cup after use (e.g., before placing it in a purse, bag, or backpack) to avoid dripping soda and before a next use (e.g., to remove sand from the water park and so on).

Hence, there remains a need for methods and systems for better controlling access to self-service dispensers such as those used to dispense soda and other beverages. Preferably, such methods and systems would address problems with continued misuse of self-service beverage dispensers and also the inconveniences associated with an all-you-can-drink cup.

SUMMARY OF THE INVENTION

The present invention addresses the above problems by providing a system for providing self-service vending of snacks or beverages, and the system is token-based rather than based on use of a particular container. The system includes a self-service vending machine, such as a beverage dispenser or a snack vending machine. The vending machine includes a controller that operates to selectively dispense goods (e.g., to operate an actuator to dispense a volume of a soda or other liquid beverage or a snack, such as candy bar, a piece of fruit, a frozen food item, or other vended food product). A token reader/scanner is provided on the dispenser or otherwise linked to the controller. The system further includes tokens that are provided to users of the system, such as guests to a water park, hotel/resort guests, customers of a food court or restaurant, and the like. The tokens each include a set of access data, and during use of the system, the token reader reads the access data and provides it to the controller. The controller then dispenses a unit of the goods based on the access data read from the token. The system provides token-based vending services with the token typically being a hand-held or wearable object providing the access data, such as with an RFID tag on a bracelet or pin, with a magnetic stripe on a card or room key, a bar code on a ticket media, memory in a wireless communication device, and so on. For example, the vending machine may be a beverage dispenser that dispenses a volume or unit of a drink, and use of the system may involve a user obtaining a disposable container near the dispenser and presenting their token to the token reader (with the token being separate from the container).

In some cases, the access data is stored on each of the tokens and includes a defined entitlement to access the self-service vending machine. The defined entitlement may be for unlimited access to this or other vending machines, or it may be a counter or value indicating a number of units obtainable from the self-service vending machine. When the entitlement is for a number of units (e.g., 10 drinks or snacks over a defined time period or the like), the token reader (or another device associated with the dispenser) may be operable to write data to the tokens. For example, the controller may operate the token reader/writer to modify the counter to reflect the dispensing of the unit of the goods, such as by decrementing the counter to show that fewer units are available during future accesses of this or other vending machines. In some embodiments, the controller is communicatively linked to data storage that stores user records that each defines an entitlement for a user to access the self-service vending machine. In such embodiments of the system, the access data may include a link to one of the user records (such as a user identifier, a purchase order number, or the like), and the controller may perform a backend look up to selectively control the dispensing of the unit of the goods.

DETAILED DESCRIPTION OF THE PREFERRED EMBODIMENTS

Figure 1:
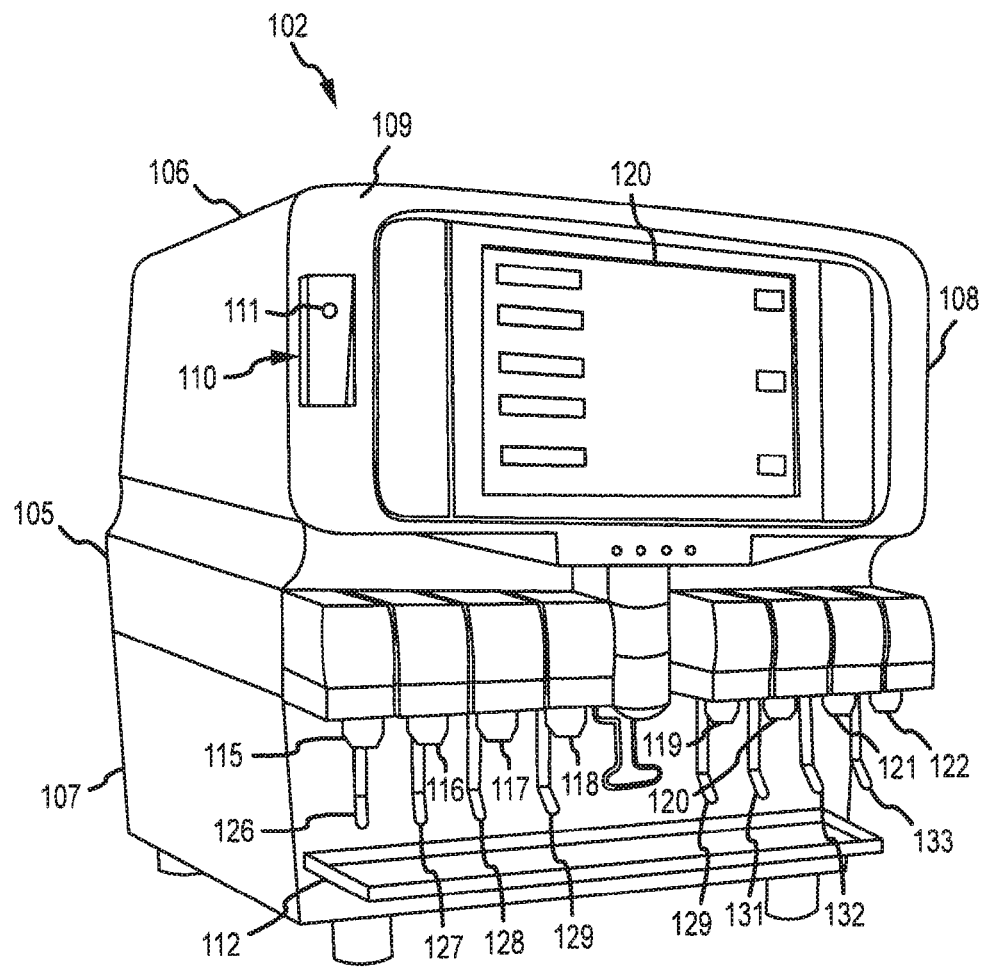
FIG. 1 illustrates a perspective view of self-service beverage dispenser of an embodiment of the invention with a reader for reading and/or communicating a user's access token.
Figure 1:
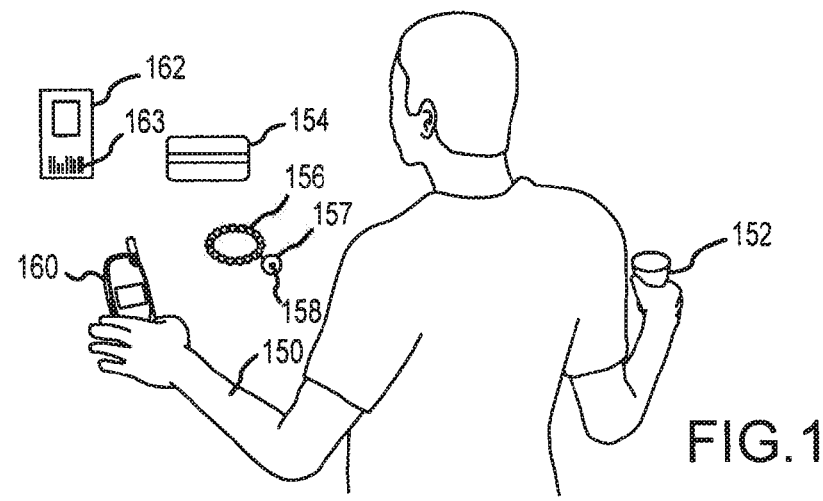

Briefly, embodiments of the present invention are directed to token-based vending that controls access based on association of entitlements (e.g., prepaid units) with a person or identity of a customer/user. The token-based vending maintains the higher efficiencies obtained with allowing customers to serve themselves with self-service beverage and/or snack dispensers (or vending machines) while preventing unfettered access, which is especially important in unmonitored or lightly monitored environments such as amusement, theme, and water parks and the like. Briefly, at a point of sale, a unique identifier or token will be associated with a customer's order for beverages or snacks. The token may be a room key or other card with a magnetic strip or RFID tag, a ticket or similar media with a bar code, a bracelet or other worn object with a charm with an RFID tag, a wireless communication device such as a Near Field Communication (NFC)-enabled phone, or the like. The token may include access data in the form of a readable code (e.g., a bar code) on a token surface or digital data stored in data storage of the token such as memory of a passive RFID tag or storage on a magnetic stripe card.

The access data may be linked or associated to the customer's order and/or include data on the present status of the token holder's entitlements (e.g., right to unlimited snacks and/or drinks in a particular time period and/or geographic area, right to a particular number of drink fills or snacks, and so on). The access data is used by a controller linked to the data reader (e.g., bar code scanner, RFID reader/interrogator, or the like) to verify authorization and activate/operate a vending machine or dispenser (e.g., allow the token holder to fill a cup at a soda fountain equipped with the token scanner/reader). The access granted by the dispenser controller may be tied to a specific entitlement purchased or to an order, such as 1 to N beverage cup fills and/or snack vends during a particular time period and/or within a particular facility or geographic area or such as unlimited beverage cup fills and/or snacks for a defined meal period or any other useful time period (which may be defined with a start and stop time/date encoded on the token or accessed via a backend database lookup). The token-based vending described herein associates the entitlement with the customer and not with a particular cup or glass as in some prior beverage dispensing control schemes. Access may also be controlled so as to allow for a certain number of fills, and, in some cases, the fills may be used in one facility or in more than one facilities (or via more than one beverage or snack dispenser) such as anywhere within a single restaurant, at any dispenser within a particular entertainment facility (such as within a water park, amusement park, sports arena/stadium, or the like), at any dispenser operated by a particular provider (e.g., at nearly any dispenser with no limit on facility or location), and so on.

In some cases, the "order" may be associated with a group (such as a family) rather than one individual, and more than one token (e.g., room keys, ticket media, RFID-tagged items such as bracelets, and the like) may be issued to the group with each member being able to use a token to gain access to a self-service beverage or snack dispenser (e.g., an unlimited access order for a family for the length of a stay at a resort, a number of units (e.g., snacks, beverage fills, and so on) over a particular time period, and the like). In this manner, a family or traveling group may share the entitlements, and the entitlements are not necessarily limited to the person making the order. Additionally, since the entitlements or number of units is linked to the buyer/user via a token, the user may in some embodiments treat others to their units (e.g., drinks, snacks, and so on) by using their token, which may result in their count of available units being reduced for each unit they share with others or use (e.g., a count stored on an RFID tag or in a backend/centralized data record may be decremented or incremented to reflect the number of uses by the customer and to verify additional units are available prior to operating a dispenser to fill a cup or dispense a snack or the like). Another example in accordance with the invention is a situation where the use is "metered," such as N units per time period. For example, a parent may purchase an entitlement with "metered use" that allows their child (or any family member) X drinks and/or Y snacks per day (or some other useful time period). The entitlement may be shared among the family members each using differing or shared tokens, but, in other embodiments, each family member may have a separate token with a unique entitlement associated with that family member.

FIG. 1 illustrates a self-service beverage dispenser 102 as may be used by a customer or user 150. The user 150 may obtain an inexpensive, disposable cup 152 (or may be carrying a cup or other container with them) nearby the beverage dispenser 102 and approach the dispenser 102 to fill the cup 152 with soda pop or another liquid beverage dispensed from the dispenser 102. The dispenser 102 is adapted to determine whether the user 150 has the right to access the dispenser 102. When entitlements associated with the user 150 are verified by a controller (not shown) within or associated with the dispenser 102, the dispenser 102 operates via its controller to dispense a volume of soda or other liquid into the cup 152. The user 150 provides proof of such vending entitlements by presenting a "token" or element that includes access data (e.g., an RFID tag with stored access data, a bar code, data stored in a magnetic stripe, data provided in a wireless communication device such as an NFC phone, or the like).

As shown, the user 150 may present a token in the form of magnetic stripe card 154 such as a purchased and activated/loaded beverage/snack card, a room key, or the like. Alternatively, the user 150 may present a bracelet 156 (or other wearable or portable/carried object) with a charm 157 (or pendant or other element on such bracelet or integral with the token 156) with an RFID tag 158 to the dispenser 102. In other cases, the customer 150 may carry ticket or ticket media 162 (or another portable/wearable object) with a bar code 163 associated with an authorized order for entitlements. In other embodiments, the customer 150 may present or carry a wireless communication device 160 such as an NFC phone that can be read or processed/interrogated by the dispenser 102 to determine whether the customer 150 has an entitlement (or has paid for an order for a number of beverage fill units) that allows access to the dispenser 102.

In one embodiment as shown, the dispenser 102 includes a reader/scanner 110 that operates to scan or read the token 154, 156, 160, 162 and, based on the entitlement (or lack thereof) identified, a controller within the dispenser 102 operates the dispenser 102 (or its actuators 126-133) to dispense liquid or soda and to communicate with the customer via screen/display 120. The controller or scanner 110 may also operate to indicate to the customer 150 when the scanning/reading has been successful such as by activating a light 111 or changing the light color (e.g., from red to green or the like) to provide visual indication that the token is being processed. In some cases, audio signals will be provided to supplement such visual indications (e.g., providing instructions on use of the scanner/reader 110 and/or use of dispenser 102 to use their entitlements or to gain assistance when no entitlement is available to allow proper access). The customer 150 may further receive instructions and/or results of such scanning via a user interface or information displayed on the screen 120 (e.g., token read but no entitlements available, token read and entitlements available displayed, and so on).

With the token 162, a bar code sticker or element 163 may be applied to the ticket 162 when a customer 150 purchases an entitlement (e.g., unlimited use of dispenser(s) 102 during a particular time period, a number of uses for a meal period or other time period, and so on). The scanner 110 may be adapted for reading or scanning bar codes 163, and the code 163 would include access data defining the entitlement available for the customer 150. For example, the bar codes 163 may include (or provide a link to a look up table of access data stored in memory in or accessible by the dispenser 102) readable data indicating an unlimited access entitlement good for a particular date/time period, and the dispenser 102 controller may act to determine that the current time (e.g., based on a clock in dispenser 102) is within this date/time period prior to activating the actuators 126-133.

In other cases, the token 154 may be a room key, a card, or other object with a magnetic stripe that may be used to store access data including the user's purchased entitlements to access to the beverage dispenser 102. For example, the customer 150 may be staying at a hotel or resort, and they may purchase entitlements to use self-service beverage dispensers, such as dispenser 102. This access data or entitlement information may be encoded on their hotel key (e.g., within the magnetic stripe (or in an RFID tag in other embodiments)). In general, the magnetic stripe card 154 is a card that is capable of storing information, such as access data, by being adapted to allow writing data to the stripe including modifying the magnetism of magnetic particles on a band or stripe of magnetic material on the card 154. The data storage may occur at the point of sale of the entitlements (e.g., a resort check-in desk, a beverage/snack purchase machine/kiosk, or the like) but may occur at the dispenser 102 in some embodiments, such as by providing a payment receipt component (e.g., a credit/debit card reader, a currency acceptance assembly, and the like) and a magstripe writer at or near the dispenser 102 to allow the user 150 to buy entitlements.

The reader 110 typically reads the magnetic stripe by physical contact and/or by swiping past a reading head (not shown). In some embodiments, the magstripe card 154 is manufactured according to International Standardization Organization (ISO) standards that define physical properties of such cards including location of the magstripe and its magnetic characteristics, and the reader may be magstripe reader adapted for reading the data (e.g., data stored in tracks or the like) from a particular ISO standard card. In some embodiments, a writer will also be provided (such as another slot provided in read/write device 110) to update or change the access data, e.g., to change the count after a use, while in other cases, the access data 154 is not changed at the dispenser 102. For example, the card 154 may be used only for unlimited access entitlements (e.g., similar to the bar code 163 embodiment). In other cases, though, the card 154 may be used to provide a user and/or order identifier in its stored access data. The dispenser 102 may communicate with a data storage device (not shown in FIG. 1) to look up the records for the user 150 and whether the user 150 has entitlements providing them access to the dispenser 102 and to update, when necessary, the entitlement records in the backend/centralized storage location (e.g., to decrement a counter based on use of the dispenser 102 such as to reduce the number of available units (e.g., fills) left on the card 154).

The customer 150 may also be issued an object with an RFID tag 158 such as, but not limited to, a bracelet (or a necklace, pin, or the like) 156 they can wear or readily carry with a charm/pendant 157 with the tag 158. For example, the bracelet 156 may be used at a water park or similar setting and take the form of a waterproof bracelet worn on the wrist of the customer 150. The tag 158 may also be embedded in the bracelet itself 156, without the need for a charm 157, or the two may exist simultaneously. For example, a customer may buy an unlimited drinks entitlement, which is stored on the tag 158 embedded on the bracelet 156, but the customer may be able to purchase a charm, possibly as a retail item, that has a tag (an additional tag (not shown)) with an all-day popcorn entitlement such that a customer or user 150 may have multiple tags typically with differing entitlements. During use, the customer 150 simply brings the RFID tag 158 (or token 156) within a predefined range of an RFID reader 110 that reads the access data by interrogating the tag 158 and uses this data to determine whether or not to allow access to or use of the dispenser 102 to fill the cup 152. In general, the tag 158 (except for the storage of the access data described herein) and RFID reader 110 may take any conventional form known by those skilled in the art. RFID technology is used in some embodiments for its automatic identification technique that includes storing access data on the tag or transponder 158 of token 156 and then remotely (without contact being required) retrieving or reading data with RFID reader 110. The RFID tag 158 may include an integrated circuit for storing the access data and for modulating/demodulating an RF signal from the reader 110 and may further include an antenna for receiving and transmitting a signal regarding access authorization and/or writing to the access data to modify a unit count.

For cost and other reasons, the tag 158 typically is a passive RFID tag with no internal power supply, and an electrical current induced in the antenna by an incoming RF signal from the reader 110 provides power to the integrated circuit, such as for transmitting a response to the reader 110. The range of the RFID tag 158 may be several inches requiring the user to hold the token 156 proximate to the reader or may be several feet allowing the reader 110 to obtain the access data in tag 158 when the customer 150 is standing in front of the dispenser 102 (e.g., bracelet token 156 on wrist holding cup 152 near soda/liquid dispensing units or on opposite arm held naturally at the customer's side, which may be several feet from reader 110). At the point of sale, the RFID tag 158 typically is written so as to store a set of access data on the tag 158. In some embodiments, the RFID reader 110 modifies the access data when the user 102 accesses the dispenser 102 (e.g., to reduce an available unit count or the like). In other cases, the access data on tag 158 remains unchanged during use (such as when the access data indicates that the user has unlimited access during a time period), and/or a controller in dispenser 102 may perform a backend lookup and count modification.

The token may also take the form of a wireless communication device 160 that is able to communicate with the reader 110 to provide access data that is processed to determine whether entitlements are available to the holder 150 of the device 160. For example, the wireless communication device 160 may be a Near Field Communication (NFC)-enabled phone. NFC is a short-range high frequency wireless communication technology that may be used to enable the exchange of data such as access data (and modifications to a stored unit count) between the devices 110, 160. In some cases, the reader 110 may be a smartcard reader, with the NFC device 160 being adapted per the ISO 14443 proximity-card standard (e.g., contactless card/RFID). Typically, the device 160 may have to be held or positioned relatively close to the reader 110 when it is an NFC-enabled device, e.g., within about 20 cm or the like, to support typically used compact antenna designs. The screen/display 120 may instruct a customer 120 where and how close to position any of the tokens, including the device 160.

The dispenser 102 may take numerous forms to practice the invention, and it may be replaced with a snack or other vending machine in some embodiments. As shown, the dispenser 102 is a self-service beverage dispenser that is controlled or operated based on processing of access data obtained from or read from tokens 154, 156, 160, 162 of a user 150 by reader 110. FIG. 1 illustrates a self-service beverage dispenser or dispensing system 102 according to one embodiment of the invention adapted for dispensing soda or other fountain-type drinks, but other embodiments may be adapted for dispensing differing beverages such as hot liquids. Beverage dispensing system 102 includes a dispenser housing 105 having a top surface 106, side panels 107 and 108, front face 109 and back surface (not shown). The system 102 also includes a drip tray 112, valves 115-122, a display screen 120, and lever actuators 126-133. Valves 115-122 are controlled by corresponding dispensing head electronics (not shown) and a controller linked to the reader 110. It should be understood that the basic components of the beverage dispensing system 102 are not limited by this description. For example, actuators may be levers as shown or buttons or any other type of actuator known in the art. The dispensing of beverage may also be activated by sensing a cup below one of valves 115-122, after authorization of access for the user 150 based on processing of the token-provided access data. Further, the shape and size of the housing 105 may vary according to the needs of the establishment where the beverage dispensing system 102 is located.

Figure 2:
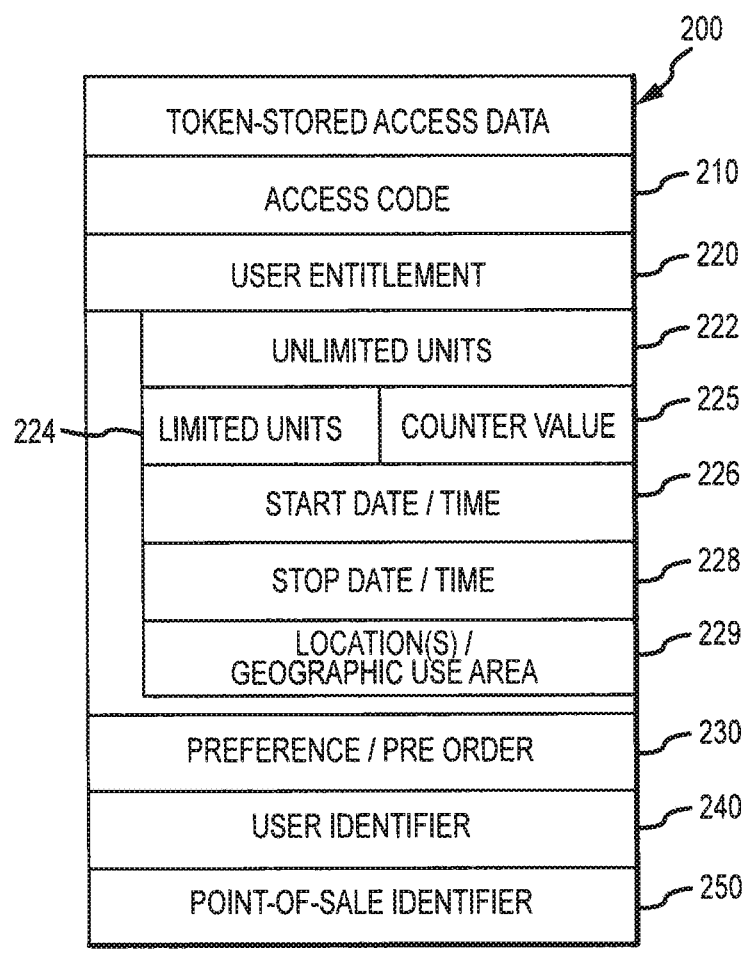
FIG. 2 illustrates dispenser access data (or data fields) that may be stored on an access token (e.g., in data storage of an RFID tag, magnetic stripe of a card/key, in memory of a wireless communication device such as NFC device, or other memory on token)

The quantity and type of access data that may be stored on each access token may be varied to implement embodiments of the invention. Generally, the access data provides verification that the holder of a token (or the token itself) has been authorized to a particular entitlement for accessing a self-service vending device such as a snack vending machine or a beverage dispenser (e.g., the dispenser 102 or the like). FIG. 2 illustrates access data or an access data record 200 (e.g., an access data record stored digitally on a token or accessible in memory based on a look up after reading a code or identifier on a token). The illustrated access data 200 provides exemplary fields or testes of data that may be used in accordance with the invention to link access to a buyer or to a group associated with a customer/user and, in some cases, to track use of the units of entitlement associated with the user.

As shown, the access data 200 includes an access code field (or number of bits) 210 that may store information useful for determining whether the token or holder of the token may access a particular dispenser. The data 200 may, in some implementations, be stored on standards-based RFID tags, such as the FeliCa or MiFare™ RFID chips/smartcards available Sony Corporation and NXP Semiconductors, respectively, and commonly used for RFID payment systems. For example, the access code 210 may store a security code or the like that may be used by a controller to determine the token is an authentic or authorized token. In other cases, the access code 210 may store an order number or similar information that a dispenser controller can verify to authorize the token (or holder of the token) to access a dispenser. The access data 200 also includes data or information defining the user's entitlement(s) in field 220. As shown, the user entitlement 220 may include a field or set of bits 222 that indicates to a reader or controller processing the data that the entitlement associated with the user is for unlimited units (e.g., unlimited drinks and/or snacks). In other cases, the field 222 may indicate that the user does not have unlimited access but instead field/bits 224 may indicate the user entitlement 220 is for a limited number of units, such as 1 drink, 5 drinks, 10 drinks, or some other quantity. The particular count or number of units available to the user may be set or stored in counter value field/bits 225. During use in some implementations, the dispenser will include a writing module or software that acts to change the counter value 225 to indicate use of the limited units 224, such as by incrementing or decrementing the counter value 225 from its pre-use value. In some implementations, the user may order more than one unit at a particular use or access of a dispenser, and these units would be reflected in the changes to the counter value 225, which may be useful when the user entitlement is used by a family or group or when a user wants to share their entitlements (which would be impractical when access is tied to a particular cup).

Typically, the entitlements 220 will also be tied or limited to a particular time period. For example, the user entitlement 220 may be defined by a start date and time stored in field 226 and a stop date and time stored in field 228, and the controller or reader/processor of the token access data 200 may operate to compare a time of an attempted access with the values of in the start/stop data and time fields 226, 228 to ensure the access time is within this access time period or time range. For example, a user may buy an entitlement for unlimited access to a beverage and/or snack dispenser(s) during their stay at a resort or during a particular meal period or some other time period. The entitlement 220 may also be defined as applying to a particular or limited location, facility, and/or geographic use area with a value or code stored in field 229. For example, the entitlement 220 may allow the user to access self-service beverage and/or snack dispensers only at particular restaurants, food courts, or kiosks or, in contrast, may allow the user to access such devices at a subset of parks/resorts within an entertainment complex. In this manner, differing entitlement packages or options may be designed and/or priced to support differing customer/user needs.

In some cases, the access data 200 may also include a user's predefined or selected preferences and/or orders in a field 230. For example, a user may indicate that their preference is for a large cup/glass of a particular soda or hot drink, and the dispenser would operate to make or provide the preferred or preordered drink to the user upon presentation of the token with the access data 200. In some implementations, a token and the access data 200 may be used in a setting without a self-service dispenser, and, in these cases, people or service providers prepare the beverages or snacks, such as may occur at a coffee shop, a cafeteria, or the like. The point of purchase may include a token scanner or reader that determines the user has a proper entitlement (e.g., by processing the access code 210 and/or the entitlement fields 220) and then acts to determine the user's order via data in field 230. For example, the user may prefer a particular size and type of coffee drink, and the user may swipe or present the token to the reader/scanner, which communicates the order to workers (e.g., via an order display/GUI behind the counter or the like) who act to prepare the order. There is no need for a worker to interact with the user/customer to take the order or to obtain payment (e.g., by verifying unlimited access or by decrementing/incrementing a unit counter 225). The access data 200 may also include a user identifier 240 such as the user's name or a code/identifier provided by the user, and, in the above example, the worker's at the coffee shop may associate the order with the user's identifier and call out the identifier when the order is ready. The access data 200 may also optionally include a point-of-sale identifier 250, which indicates where the entitlements were added to the token (or the token provided to the user), and this data may be useful for providing enhanced customer service (e.g., address potential issues with the order) and/or facilitate proper recordkeeping.

Figure 3:
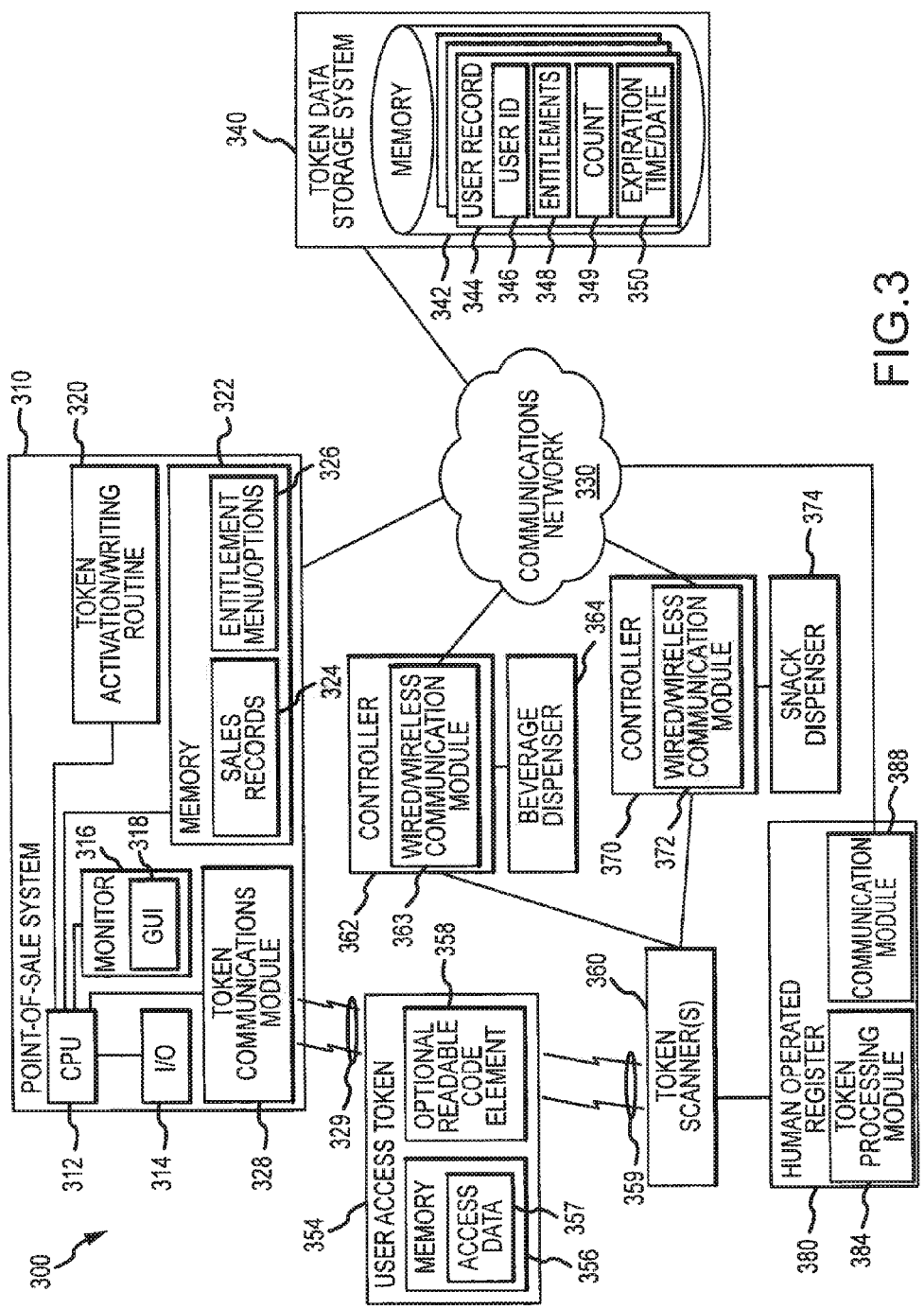
FIG. 3 is a functional block diagram of a beverage and snack dispensing system of an embodiment of the invention illustrating use of backend storage of user records including unit counts available for a user to use self-service beverage and snack dispensers.

FIG. 3 illustrates a token-based vending system 300 in accordance with one embodiment of the invention. In the system 300, a point-of-sale system 310 is provided, such as may be located at a hotel or resort check-in desk, at restaurant, or other convenient location for selling entitlements to customers. The point-of-sale system 310 may be a computer or computer-based device with a processor 312 that runs one or more input/output (I/O) devices 314 such as a keyboard, a touchscreen, a mouse, and the like to allow an operator (such as token/dispensing entitlement salesperson) to enter information for a buyer. The system 310 also includes a monitor 316 for displaying information to the operator, who may be the buyer in an application where the system 310 is a self-service token dispenser (or a system 310 adapted for placing additional units on a previously purchased token). The monitor 316 may be operated by the CPU 312 to display a GUI or other interface 318 to facilitate entering buyer information and entitlement information, and, in some cases, a menu of options will be presented to the buyer regarding the available entitlements, the associated costs, possible preorders/preferences, and so on.

The system 310 may also include a token activation/writing routine 320 run by the CPU 312 to respond to input from a buyer and/or a salesperson to communicate and/or store access data on the purchased token, e.g., via a token communications module 328 (e.g., an RFID interrogator, a magstripe reader/winter, a wireless NFC communication device, or the like). For example, the CPU 312 may use the activation/writing routine 320 and communications module 328 to transmit and/or write access data (such as access data 200 of FIG. 2) onto a user access token 354 as shown at 329. The point-of-sale system 310 may further include memory (or have access to memory) 322 and a variety of data may be stored to support sales of, or adding of entitlements to, tokens 354. For example, sales records 324 may be stored in memory 322 to track user's/purchaser's identities, the order information, and the purchased entitlements. The memory 322 may also store entitlement menus/options that may be displayed via the GUI 318 on monitor 316 to a salesperson or other operator (e.g., the buyer) of the system 310. For example, the entitlement menu data 326 may indicate the types of entitlements that are available for purchase, pricing, and other selectable aspects (e.g., information to further define and/or tailor the entitlement to the user such as a number of units, an access time period, a geographic area of use, and so on).

The token-based vending system 300 further includes a plurality of user access tokens 354 that are provided to users/customers to allow them to access snack, beverage, and other types of vending services. Each access token 354 may include memory 356 for storing access data 357 (e.g., the data 200 of FIG. 2 or the like). Some embodiments may not provide memory on the token such as when a bar code is provided, and, in these embodiments, a readable code element 358 typically will be provided on a surface of the token 354. The system 300 also includes token scanners or readers 360 that interrogate or scan the token as shown at 359 to obtain or read the access data 357 (or a code in element 358). In some portions of the system 300, the token scanner 360 may provide the access data to a controller 362 via a wired or wireless communication module 363 for use in controlling access to a beverage dispenser 364 (e.g., the dispenser 102 of FIG. 1 or the like).

In some embodiments, the communication module 363 is used to communicate with a token data storage system 340 via a communications network 330 (e.g., a digital network such as an intranet or the Internet). In such cases, the token 354 may only store limited data or simply include a code that allows a look up to be performed to determine whether the user or holder of the token 354 has an entitlement to access the beverage dispenser 364. For example, the storage system 340 may include memory 342 that stores a plurality of user records 344. Information or access data 357 (or a code on element 358) such as an access code, a user identifier, a purchase order number, or the like may be used to obtain a particular record 344, e.g., by doing a search or look up for a matching or corresponding user ID 346. When a user record 344 matching the token 354 is found, entitlement data 348, count information 349, and/or expiration time/date 350 may be provided to the controller 362 for use in determining whether to grant access to the dispenser 364. In other embodiments, a processor and updating/order processing module may be provided on system 340 to determine if the order/access request should be fulfilled by the controller (e.g., by activating an actuator on the dispenser 364). In either case, the counts 349 will be updated to reflect a user's accessing the dispenser (unless the entitlement is for an unlimited access/use of dispenser 364).

The vending system 300 may also include snack dispensers 374 that are adapted for self-service access with access tokens 354. A controller 370 may receive access data from token scanner 360 and, as with the beverage dispenser 364, act to determine whether the user or holder of token 354 may access the snack dispenser 374 and, if so, what type of access shall be granted. Also, the controller 370 may use a communication module 372 to communicate with the token data storage system 340 to access and/or update user records 344. The snack dispenser 374 may be used to dispense snacks such as candy, chips, gun, and so on that have a single unit value or may be used to dispense snacks with more than one unit value. Hence, in some embodiments, the controller 370 determines from the access data 357 (with or without accessing the user record 344 associated with the token 354) what type of entitlement the user has and how many unit counts are available. Based on this information, the controller 370 may allow the user to access a snack with a first unit value associated with it and/or to access any snack (or snacks with a second unit value). For example, a user may have 2 units available in their entitlements, and the dispenser 374 may contain snacks with a 1-unit value and a 2-unit value. The user, in the case, would be allowed to vend any snack in the dispenser, whereas if the user only had 1 unit available based on their unit count in their entitlements the controller 370 may act to only allow vending of the 1-unit snacks.

The system 300 may also include a human-operated register such as a checkout register in a cafeteria or the like. The register 380 may include or communicate with the token scanner(s) 360 to obtain access data 357 (or code data from element 358). The register 380 may include a token processing module 384 that is run to determine what entitlements the person presenting a token 354 has available, and this may involve using a communication module 388 to communicate with the token data storage system 340 via network 330 (or directly). For example, an access token 354 may include access data 357 indicating the user has a number of units available as their entitlement for accessing an area where the user may obtain snacks/beverages. The user may present the token with one or more snacks/beverages at the register 380, and the register 380 may run the token processing module 384 to process the order (e.g., reduce the available counts associated with the token by the number of or unit value of the presented snacks/beverages).

Figure 4:
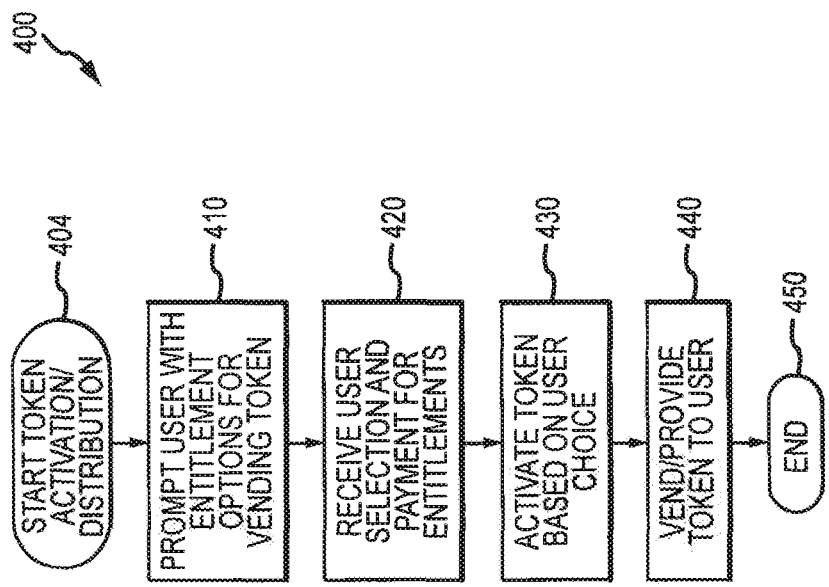
FIG. 4 is a flow diagram showing a token activation/distribution process in accordance with an embodiment of the invention.

FIG. 4 illustrates a token sale or activation/distribution process 400 that may be performed in accordance with embodiments of the invention. The vending process 400 starts at 404 such as with defining a plurality of entitlement programs or options for customers or visitors of a facility to purchase. The purchase of the token may be automated and/or facilitated by a human operator or salesperson. For example, guests of a hotel or resort may be offered a beverage entitlement package for unlimited beverages and/or snacks during their stay at participating or token-based vending machines. In other cases, the guests may be offered a beverage and snack entitlement for a particular number of beverages and/or snacks, such as 10, 20, 30, or the like. At 404 (or 504 of the method 500 of FIG. 5), one or more vending machines or beverage dispensers would also be configured with a token reader and a controller with hardware/software for working in combination to control access to and operation of the vending machines and/or beverage dispensers based on access data stored on tokens, provided by readable information on the tokens, or made available via a lookup in memory using a code or identifier on or stored in memory of the token.

At 410, a user is prompted with entitlement options for a vending token. Step 410 may be carried out in part by a person acting as a salesperson for the token (e.g., a hotel clerk that adds an entitlement to a room key or provides a vending token to the guest), with interaction with a point-of-sale system (as shown in FIG. 3). In other cases, step 410 is performed by a self-service token kiosk that displays entitlement options to a user, such as on a monitor screen, on a touch screen, via speakers with audio prompts, and so on. In some implementations, the token may be purchased prior to arriving at a location where it may be used, e.g., pre-vacation or pre-travel to a vending machine location. Such a purchase may occur at physical location, such as brick-and-mortar store (e.g., a business or service selling vacations (e.g., tokens provided as part of the vacation package or the like) and entertainment packages, a retail store associated with the destination facility, and so on) and/or may occur via remote communications between a seller and a buyer such as via telephone communications or via an online interaction (e.g., an online shopper may visit a website that facilitates the steps of method 400 to activate and distribute a token).

At 420, the process 400 includes receiving the user's selection and payment for entitlements. In this step, the user may instruct a token salesperson they want to purchase a particular entitlement package/option and provide a form of payment (e.g., cash, check, credit/debit card, or the like). Alternatively, the user working with a self-service token kiosk may select an entitlement option (such as via a touchscreen selection or the like) and insert payment (such as by providing a credit/debit card number, inserting or swiping a credit/debit card, inserting case, and so on into a payment acceptance/processing component of the kiosk). At 430, the token is activated based on the user's choice, and activation may include applying a bar code to a ticket or other media, storing access data indicating the purchased entitlement on an RFID tag or magnetic stripe, and the like. At 440, the token is vended or provided to the user (in person or by other distribution methods) for their use in accessing self-service vending machines/dispensers. The method 400 ends at 450.

Figure 5:
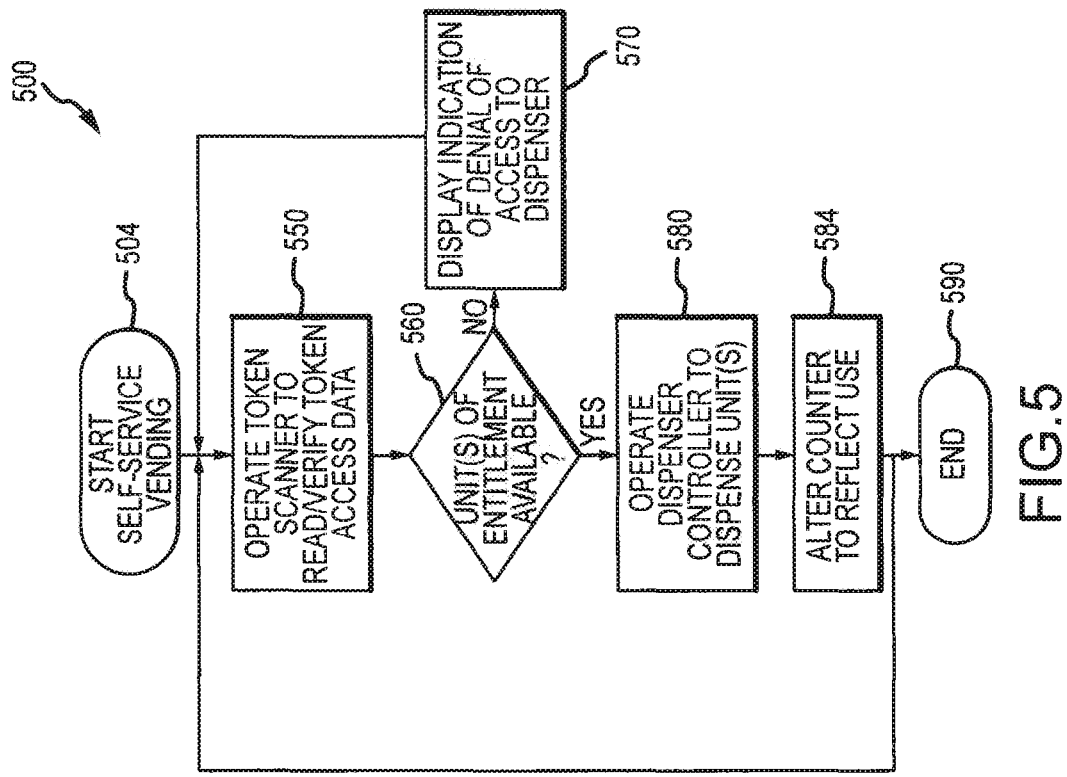
FIG. 5 is a flow chart showing a self-service vending or token use method of an embodiment of the invention using user identity-based access control for automated beverage and/or snack dispensers.

FIG. 5 illustrates a method 500 for using a token (such as, but not limited to, a token from method 400) to access self-service vending machines, and the method 500 starts at 504 such as by selective placement of vending machines on a property or in a facility and configuration of the machines (e.g., as discussed with reference to FIGS. 1 and 3). Method 500 continues at 550 with operating a token scanner to read/verify a token by processing its access data. For example, a user or holder of a token may present the token to a self-service beverage dispenser (e.g., allow their RFID tag to be read, swipe their magnetic stripe card, and so on) and request a cup/glass to be filled. During 550, the scanner or interrogator reads the access data and determines whether the token is a valid token and whether the user has any entitlements (or unit counts) available. At 560, the method 500 includes determining whether there are any units available to support vending. If not, at 570, the method 500 may include displaying indication of denial of access to the user, such as via a screen on the dispenser, an indicator light, or one or more speakers. The method 500 may continue at 550 with waiting for another token to be presented. In some cases, at 570, the token user will be encouraged to purchase additional entitlements (or unit counts), and such a purchase may be supported at the dispenser (such as by accepting payment and writing data to the token) or with a referral to a token point of purchase.

If at 560 it is determined that there are units available, the method 500 continues at 580 with operating the dispenser controller to dispense selected units, such as volume of a particular beverage or a user-selected snack. At 584, the user's available unit count is altered to reflect the use of the dispenser. The method 500 may continue at 550 with waiting for additional tokens to be presented at a dispenser or vending machine. Alternatively, the method 500 may end at 590.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In some embodiments, the user or customer is further linked or associated with the entitlement to limit misuse or non-permitted uses such as use of a lost or misplaced token by another or transfer of the token to another (e.g., entitlements may be personal and non-transferable in some settings). Further linkage between the token or entitlement and the individual may be provided by having the access data include an identifier of the customer or user (e.g., the purchaser's name, a portion of their social security or driver's license number, or the like), and then the dispenser may be further equipped to verify the user's identity such as by swiping an identification card (e.g. a driver's license or a credit/debit card with a magnetic stripe), by use of biometrics such as via a sensor upon which a customer can place a finger, by voice recognition, and/or by other techniques for confirming an identity of a customer. When the identity associated with the entitlement and the second source of identification are determined to match, the controller of the self-service vending machine or beverage/snack dispenser may provide access and, when appropriate, modify the entitlement count to reflect the use or access to the machine/dispenser. In addition, the token itself could be a biometric. For example, when a customer purchases an entitlement, his or her finger may be read and that becomes the token associated with the entitlement. Then, the customer needs only to swipe his or her finger at a dispensing unit to use the entitlement.

In embodiments of the invention, a unit count may be provided as an entitlement such as 1-50 or more units. As the user uses the token to obtain beverages or snacks, the counter or unit count is decremented (or incremented in some cases) to reflect the vending of a beverage or snack. A dollar or currency amount is not being subtracted (or added) to the token or its access data, but, instead, the token-based vending method involves tracking number of units being used. A "unit" may be defined in a variety of ways in accordance with the invention and may be a volume or size of a beverage or a particular type of snack. In some cases, the unit count is decremented/incremented with whole units while some embodiments may utilize fractional unit amounts (e.g., a 12 ounce beverage fill may be 0.5 units while a 24 ounce beverage fill may be 1 unit). However, in some embodiments, the size or type of beverage or snack is not limited and all are interchangeable as long as they are available in beverage dispensers and vending machines within the token-based vending system.

In some embodiments, the tokens are loaded or filled with entitlements (e.g., credits or units associated with a beverage or snack) on a subscription-type or renewing basis. For example, a user may obtain a token, such as a magstripe card, and have 5 units (e.g., 5 beverages) placed on it once a week (or some other time period). The user may then present the token at a self-service vending machine or dispenser or, in some cases, to human-operated point of sale (such as a coffee shop or the like), and the user's counter would be modified to reflect the use. In some cases, differing types or sizes of drinks or snacks are treated equally (e.g., each worth one unit or credit) when the counter is adjusted. For example, a large and a smaller coffee may be treated equally. In other embodiments, the person's preorder is used to initiate the order when the user swipes or otherwise presents their token (e.g., a preference or standing order for a grande house coffee or the like).

We claim:
1. A system for providing self-service vending of snacks or beverages, comprising:
   a self-service vending machine with a controller selectively dispensing goods;
   a token reader linked to the controller; and
   a plurality of tokens each including a set of access data,
   wherein the token reader reads the access data and provides the read access data to the controller,
   wherein the controller dispenses a unit of the goods based on the read access data,
   wherein the read access data includes an access code used by the controller to determine whether one of the tokens can be used to access the self-service vending machine, the controller denying access when one of the tokens is determined to not authorize access to the self-service vending machine; and
   wherein the access data comprises a defined entitlement to access the self-service vending machine, the defined entitlement including a counter indicating a number of units of the goods obtainable from the self-service vending machine.

2. The system of claim 1, wherein the self-service vending machine comprises a beverage dispenser, wherein the unit of goods comprises a volume of a liquid beverage dispensed into a container, and wherein the tokens comprise a portable object separate from the container.

3. The systems of claim 1, wherein the access data is stored on each of the tokens.

4. The system of claim 1, wherein the token reader is operable to write data to the tokens and wherein the controller operates the token reader to modify the counter to reflect the dispensing of the unit of the goods.

5. The system of claim 1, wherein the controller is communicatively linked to data storage storing user records each defining an entitlement for a user to access the self-service vending machine and wherein the access data includes a link to one of the user records, whereby the controller performs a look up to selectively control the dispensing of the unit of the goods.

6. The system of claim 1, wherein the tokens comprise portable objects adapted for transport with a user and the access data is stored within an RFID tag, a magnetic stripe, or a barcode portion of the objects.

7. The system of claim 1, wherein the defined entitlement further includes a geographic use area defining one or more geographic areas and wherein the controller provides access to the self-service vending machine only when the self-service vending machine is located within boundaries of the one or more geographic areas.

8. A token for use in accessing a plurality of self-service vending machines with a memory reader, comprising:
   a body;
   a data storage element on the body readable by the memory reader; and
   a set of access data stored in the data storage element, the access data comprising an access code and a user entitlement defining access rights to the self-service vending machine, whereby the token provides access to the vending machine based on a combination of the access code and the user entitlement,
   wherein the plurality of self-service vending machines are located in a first geographic location and in a second geographic location,
   wherein user entitlement defines access rights limiting access to the self-service vending machines in one of the first and second geographic locations, and wherein the access rights further include data defining an access time period for accessing the vending machine.

9. The token of claim 8, wherein the body is selected from the group consisting of a plastic card, a ticket media, a wireless communication device, and a wearable object and wherein the data storage element comprises a magnetic stripe, a barcode, or a passive RFID tag.

10. The token of claim 8, the access rights comprises a number of units associated with beverages or snacks dispensed by the vending machine.

11. A token-based vending method, comprising:
 operating a token activation module to write access data in a data storage element of a token, the access data defining a number of units available to a token holder;
 at a dispensing location, reading the access data from the data storage element with a token scanner;
 with a controller, processing the access data to determine whether to grant access to a good based on the available number of units;
 dispensing the good to the token holder; and
 modifying the access data in the data storage element of the token to reduce the available number of units based on the dispensing,
 wherein the good is associated with a unit value greater than one of the units and the modifying comprises decrementing the available number of units by the unit value.

12. The method of claim 11, wherein the dispensed goods include a plurality of goods with differing characteristics and wherein the dispensed goods are each associated with a single unit value that is decremented from the available number of units in the modifying step.

13. The method of claim 11, wherein the data storage element comprises an RFID tag, a barcode, or a magnetic stripe.

14. The method of claim 11, wherein the dispensing is performed with a self-service vending machine.

15. The method of claim 14, wherein the self-service vending machine comprises a self-service beverage dispenser and wherein the token comprises a body spaced apart from a container used to receive the dispensed good.

16. The method of claim 11, wherein the access data further comprises preference data corresponding to the dispensed good and wherein the dispensing of the good comprises preparing the dispensed good based on the preference data.

17. The method of claim 11, further comprising prior to the writing of the access data, displaying a plurality of entitlement options to a user and receiving a selection of one of the entitlement options from the user, and wherein the written access data is chosen based on the received selection of one of the entitlement options.

18. The method of claim 11, wherein the access data further includes a geographic use area defining one or more geographic areas and wherein the dispensing of the good is performed only when the dispensing location is within boundaries of the one or more geographic areas.

* * * * *

UNITED STATES PATENT AND TRADEMARK OFFICE
CERTIFICATE OF CORRECTION

PATENT NO. : 8,972,048 B2
APPLICATION NO. : 12/275062
DATED : March 3, 2015
INVENTOR(S) : David J. Canora and Scott W. Rench Page 1 of 1

It is certified that error appears in the above-identified patent and that said Letters Patent is hereby corrected as shown below:

In the Specification

Column 10, line 1, delete "winter" and insert therefor --writer--.

Column 11, line 5, delete "gun" and insert therefor --gum--.

Signed and Sealed this
Thirtieth Day of June, 2015

Michelle K. Lee
*Director of the United States Patent and Trademark Office*